(12) United States Patent
Lee et al.

(10) Patent No.: US 8,497,949 B2
(45) Date of Patent: Jul. 30, 2013

(54) LIQUID CRYSTAL DISPLAY DEVICE AND FABRICATING METHOD THEREOF

(75) Inventors: Sok Joo Lee, Kyoungsangbuk-do (KR); Soon Ho Choi, Pusan-shi (KR)

(73) Assignee: LG Display Co., Ltd., Seoul (KR)

( * ) Notice: Subject to any disclaimer, the term of this patent is extended or adjusted under 35 U.S.C. 154(b) by 474 days.

(21) Appl. No.: 12/289,465

(22) Filed: Oct. 28, 2008

(65) Prior Publication Data

US 2009/0091699 A1   Apr. 9, 2009

Related U.S. Application Data

(62) Division of application No. 09/923,810, filed on Aug. 8, 2001, now Pat. No. 7,456,910.

(30) Foreign Application Priority Data

Aug. 8, 2000 (KR) .................................. 2000-45947

(51) Int. Cl.
*G02F 1/136* (2006.01)

(52) U.S. Cl.
USPC .................................. 349/43; 257/59; 257/72

(58) Field of Classification Search
USPC .................... 257/59, 347–353, 72; 349/43
See application file for complete search history.

(56) References Cited

U.S. PATENT DOCUMENTS

| | | | |
|---|---|---|---|
| 5,825,437 A | 10/1998 | Seo et al. | 349/46 |
| 5,852,481 A | 12/1998 | Hwang | 349/43 |
| 6,081,308 A * | 6/2000 | Jeong et al. | 349/42 |
| 6,130,443 A | 10/2000 | Hong et al. | 257/59 |
| 6,215,077 B1 | 4/2001 | Utsumi et al. | 174/268 |
| 6,215,541 B1 | 4/2001 | Song et al. | 349/141 |
| 6,252,247 B1 | 6/2001 | Sakata et al. | 257/57 |
| 6,259,119 B1 | 7/2001 | Ahn et al. | 257/72 |
| 6,335,211 B1 | 1/2002 | Lee | 438/22 |
| 6,376,861 B1 | 4/2002 | Yaegashi et al. | 257/59 |
| 6,509,215 B2 | 1/2003 | Fujikawa et al. | 438/151 |
| 6,518,630 B2 | 2/2003 | You et al. | 257/380 |

(Continued)

FOREIGN PATENT DOCUMENTS

| | | |
|---|---|---|
| JP | 6-294973 | 10/1994 |
| JP | 6-301055 | 10/1994 |

(Continued)

OTHER PUBLICATIONS

Office Action issued by Korean Patent Office on Nov. 7, 2006.

*Primary Examiner* — A. Sefer
(74) *Attorney, Agent, or Firm* — McKenna Long & Aldridge, LLP

(57) ABSTRACT

A liquid crystal display device includes a substrate, a gate electrode disposed on the substrate, a gate pad disposed on the substrate, an insulating film disposed on the gate electrode and the gate pad, an active layer disposed on the insulating film above the gate electrode, an ohmic contact layer disposed on portions of the active layer, a source electrode and a drain electrode disposed on the ohmic contact layer, a passivation layer disposed on the source and drain electrodes, a pixel electrode disposed on the passivation layer and contacting the drain electrode, and a transparent electrode disposed on the passivation layer and contacts the gate pad, wherein the gate electrode and the gate pad both include a first layer formed of a first metal and a second layer formed of an alloy of the first metal and a second metal disposed at an upper surface of the first layer.

6 Claims, 7 Drawing Sheets

U.S. PATENT DOCUMENTS

| | | | |
|---|---|---|---|
| 7,101,809 B2 | 9/2006 | Jo | 438/754 |
| 2001/0050743 A1* | 12/2001 | Ko | 349/139 |
| 2002/0084419 A1 | 7/2002 | Choo et al. | 250/370.01 |
| 2002/0130324 A1* | 9/2002 | Song et al. | 257/72 |
| 2003/0085404 A1 | 5/2003 | Kim et al. | 257/72 |
| 2003/0197177 A1 | 10/2003 | Baek et al. | 257/59 |
| 2005/0206825 A1 | 9/2005 | Kaneko et al. | 349/141 |

FOREIGN PATENT DOCUMENTS

| | | |
|---|---|---|
| JP | 10-199827 | 7/1998 |
| JP | 10-240150 | 9/1998 |
| JP | 11-284195 | 10/1999 |
| JP | 2000-77669 | 3/2000 |
| JP | 2000-199912 | 7/2000 |
| KR | 10-2000-0031004 | 6/2000 |

* cited by examiner

LIQUID CRYSTAL DISPLAY DEVICE AND FABRICATING METHOD THEREOF

CROSS-REFERENCE TO RELATED APPLICATIONS

This application is a Divisional of application Ser. No. 09/923,810, filed Aug. 8, 2001, now U.S. Pat. No. 7,456,910 now allowed; which claims priority to Korean Patent Application No. 2000-45947, filed Aug. 8, 2000, all of which are hereby incorporated by reference as if fully set forth herein.

The present application claims the benefit of Korean Patent Application No. P2000-45947 filed in Korea on Aug. 8, 2000, which is hereby incorporated by reference.

BACKGROUND OF THE INVENTION

1. Field of the Invention

The present invention generally relates to a display device and, more particularly, to a liquid crystal display device and a fabricating method thereof.

2. Description of the Related Art

Generally, liquid crystal display (LCD) devices control light transmissivity of liquid crystal cells in response to video signals to display an image. Active matrix LCDs having a switching device for each liquid crystal cell is suitable for displaying moving pictures. In active matrix LCDs, thin film transistors (TFT) are typically used as the switching device. For example, an LCD may include thin film transistors (TFTs) provided at each intersection between gate lines and data lines, a lower substrate including pixel electrodes connected to TFTs, an upper substrate including color filters, and liquid crystals injected between the upper and lower substrates. The TFT comprises a gate electrode, a gate insulating film, an active layer, and source and drain electrodes and switch a data signal from the data line to the pixel electrode in response to a gate signal received from the gate line to drive the liquid crystal cell.

FIGS. 1A to 1E show a method of fabricating a lower substrate of a conventional LCD and, in particular, a TFT and a gate pad portion.

In FIG. 1A, a gate metal layer is deposited onto a transparent substrate 10 to have a thickness of about 2000Å by a sputtering process, for example. A high conductivity aluminum alloy such as aluminum-neodenium (AlNd) is usually used as the gate metal layer. Subsequently, the gate metal layer is patterned by photolithographic and wet etching processes to form gate patterns including a gate electrode 12 and a gate pad 14.

In FIG. 1B, a gate insulating film 16 is formed entirely upon the transparent substrate 10 including the gate patterns. The gate insulating film 16 may be made of silicon oxide ($SiO_x$) or silicon nitride ($SiN_x$), for example. A semiconductor layer and a semiconductor layer doped with an impurity are sequentually deposited upon the gate insulating film 16 by a chemical vapor deposition (CVD) process, for example. Then, the semiconductor layer and the semiconductor layer doped with an impurity are patterned by photolithographic and dry etching processes to form an active layer 18 and an ohmic contact layer 20.

In FIG. 1C, a source/drain metal material is deposited upon the gate insulating film 16 including the active layer 18 and the ohmic contact layer 20 by a sputtering process, for example. The source/drain metal material includes chrome (Cr), molybdenum (Mo), titanium (Ti) or tantalum (Ta), or a molybdenum alloy such as molybdenum-tungsten (MoW), molybdenum-tantalum (MoTa) or molybdenum-niobium (MoNb). The source/drain metal layer is patterned by photolithographic and wet etching processes to form source/drain patterns that include a data line (not shown), a data pad (not shown), a source electrode 22, and a drain electrode 24. Then, a portion of the ohmic contact layer 20 that is exposed between the source electrode 22 and the drain electrode 24 is removed by a dry etching process to electrically separate the source electrode 22 from the drain electrode 24.

In FIG. 1D, a passivation layer 26 is formed upon the gate insulating film 16 including the source/drain patterns. The passivation layer 26 is made of an organic material such as silicon nitride or silicon oxide, for example, or an inorganic material such as an acrylic organic compound, BCB (benzocyclobutene), PFCB (perfluorocyclobutane), for example. The passivation layer 26 is patterned by photolithographic and dry etching processes to form a contact hole exposing a portion of the drain electrode 24 and to form a contact hole exposing a portion of the gate pad 14 and a data pad (not shown).

In FIG. 1E, a transparent electrode layer is formed upon the passivation layer 26 by a deposition technique such as sputtering, for example. The transparent electrode layer is made from indium-tin-oxide (ITO) or indium-zinc-oxide (IZO), for example. Then, the transparent layer is patterned by photolithographic and etching processes to form a pixel electrode 28 and a protective electrode 30. The pixel electrode 28 is electrically connected to the drain electrode via the contact hole previously formed in the passivation layer 26. The protective electrode 30 is connected to the gate pad 14 via the contact hole previously formed in the passivation layer 26.

In such a conventional LCD device, an aluminum alloy material with high electrical conductivity is generally used as a material for forming the gate metal electrode. Since unalloyed aluminum has problems associated with hillock formation and diffusion into adjoining materials, an aluminum alloy such as AlNd, for example, has been used. However, such an aluminum alloy metal creates a large electrical contact resistance between the pixel electrode and the transparent electrode. Accordingly, the gate metal electrode utilizes a double metal layer structure including material combinations such as Mo/AlNd, Mo/Al or Cr/AlNd containing Mo or Cr, for example, which has improved electrical contact resistance with respect to materials used for forming the transparent electrode.

FIGS. 2A to 2E show a method of fabricating a lower substrate of an LCD employing a double gate metal layer.

In FIG. 2A, a first gate metal layer of an aluminum alloy metal is deposited entirely upon the transparent substrate 10 and then patterned to form a first gate pattern 31. Then, a second gate metal layer of an improved electrical contact resistance material such as Mo or Cr, for example, is deposited entirely upon the first gate pattern 31 and then patterned to form a second gate pattern 33. Accordingly, the gate electrode 34 and the gate pad 36 are formed to both include the first gate pattern 31 and the second gate pattern 33.

In FIG. 2B, the gate insulating film 16 is formed entirely upon the transparent substrate 10 including the gate electrode 34 and the gate pad 36. A semiconductor layer and a semiconductor layer doped with an impurity are sequentually deposited onto the gate insulating film 16 and then patterned to form the active layer 18 and the ohmic contact layer 20.

In FIG. 2C, a source/drain metal layer is deposited entirely upon the gate insulating film 16 including the active layer 18 and the ohmic contact layer 20 and then patterned to form source/drain patterns that includes the data line (not shown), the data pad (not shown), the source electrode 22, and the drain electrode 24. Then, a portion of the ohmic contact layer 20 that is exposed between the source electrode 22 and the drain electrode 24 is removed by a dry etching process to electrically separate the drain electrode 24 from the source electrode 22.

In FIG. 2D, the passivation layer 26 is deposited entirely on the gate insulating film 16 and the source/drain patterns. The passivation layer is then patterned to form a contact hole for exposing a portion of the drain electrode 24 and to form a contact hole exposing portions of the gate pad 36 and the data pad (not shown).

In FIG. 2E, a transparent electrode layer is deposited entirely upon the passivation layer 26 and then patterned to form the pixel electrode 28 and the protective electrode 30. The pixel electrode 28 is connected to the drain electrode via the contact hole previously formed in the passivation layer 26. The protective electrode 30 is electrically connected to the gate pad 36 via the contact hole previously formed in the passivation layer 26 and the gate insulating film 16.

As described above, the gate metal layer includes the first gate metal layer formed of an aluminum-alloy metal and the second gate metal layer that provides an improved electrical contact resistance, thereby reducing an electrical contact resistance between the gate pad 36 and the transparent electrode 30. However, two masking processes are required to form the gate metal into a double metal layer structure. The masking processes generally include a plurality of processes such as deposition, cleaning, photoresist coating, exposure, development, etching, photoresist stripping and inspection. Therefore, using a two mask process to form the gate electrode and the gate pad with a double layer structure is problematic since the large number of additional processes can create a bad process ratio and increase manufacturing costs.

SUMMARY OF THE INVENTION

Accordingly, the present invention is directed to a liquid crystal display device and a fabricating method thereof that substantially obviates one or more of the problems due to limitations and disadvantages of the related art.

An object of the present invention is to provide a liquid crystal display device and a fabricating method thereof that requires fewer masking steps.

Another object of the present invention is to provide a liquid crystal display device and a fabricating method thereof with an improved yield ratio and low cost.

Additional features and advantages of the invention will be set forth in the description which follows, and in part will be apparent from the description, or may be learned by practice of the invention. The objectives and other advantages of the invention will be realized and attained by the structure and method particularly pointed out in the written description and claims hereof as well as the appended drawings.

To achieve these and other advantages and in accordance with the purpose of the invention, as embodied and broadly described, a liquid crystal display device includes a conductive line in electrical contact with a transparent electrode having a first metal layer formed from a first metal and an alloy layer formed from an alloy of the first metal and another metal is disposed at am upper portion of the first metal layer.

In another aspect, a method of fabricating a liquid crystal display device includes the steps of forming a first metal layer of a first metal on a substrate, forming a second metal onto the first metal layer to form an alloy layer formed from an alloy including the first metal and a second metal disposed between the first metal and the second metal, removing the second metal on the alloy layer, patterning the first metal layer using a mask process to form a conductive line, forming an insulating film having a contact hole on the alloy layer, and forming a transparent electrode in electrical contact with the alloy layer via the contact hole.

In another aspect of the present invention, a liquid crystal display device includes a substrate, a gate electrode disposed on the substrate, a gate pad disposed on the substrate, an insulating film disposed on the gate electrode and the gate pad, an active layer disposed on the insulating film above the gate electrode, an ohmic contact layer disposed on portions of the active layer, a source electrode and a drain electrode disposed on the ohmic contact layer, a passivation layer disposed on the source and drain electrodes, a pixel electrode disposed on the passivation layer and contacting the drain electrode, and a transparent electrode disposed on the passivation layer and contacts the gate pad, wherein the gate electrode and the gate pad both include a first layer formed of a first metal and a second layer formed of an alloy of the first metal and a second metal disposed at an upper surface of the first layer.

It is understood that both the foregoing general description and the following detailed description are exemplary and explanatory and are intended to provide further explanation of the invention as claimed.

BRIEF DESCRIPTION OF THE DRAWINGS

The accompanying drawings, which are intended to provide further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Figure 1A:
FIGS. 1A to 1E are section views showing a conventional method of fabricating a liquid crystal display.
Figure 1B:
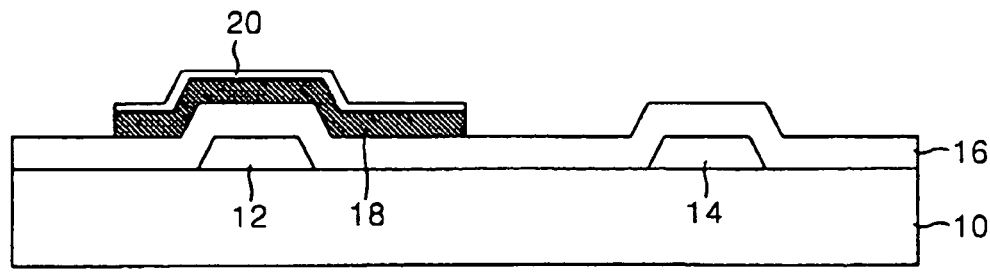
Figure 1C:
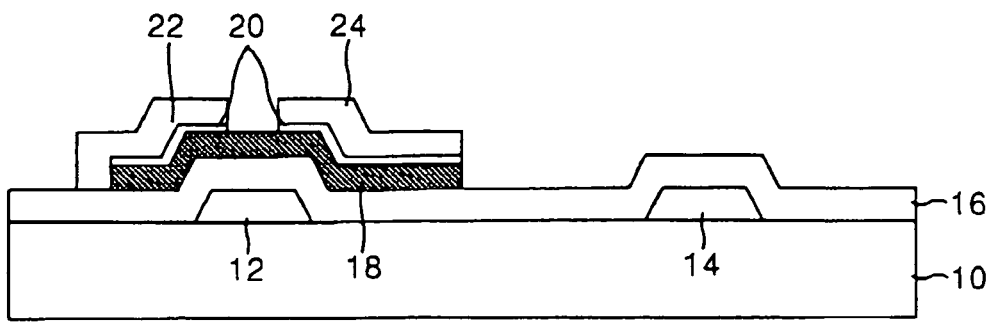
Figure 1D:
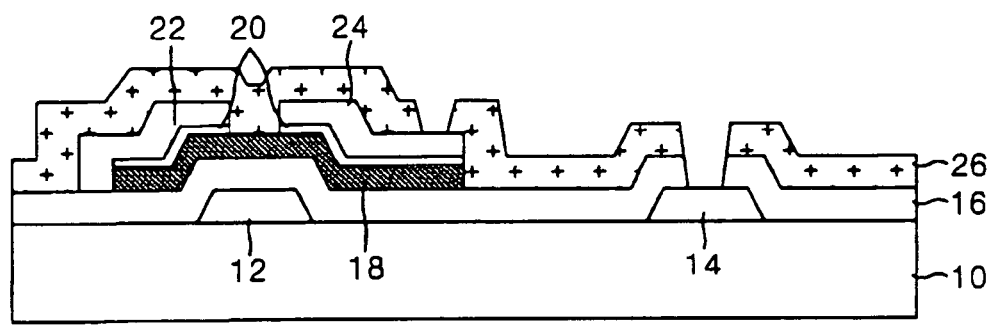
Figure 1E:
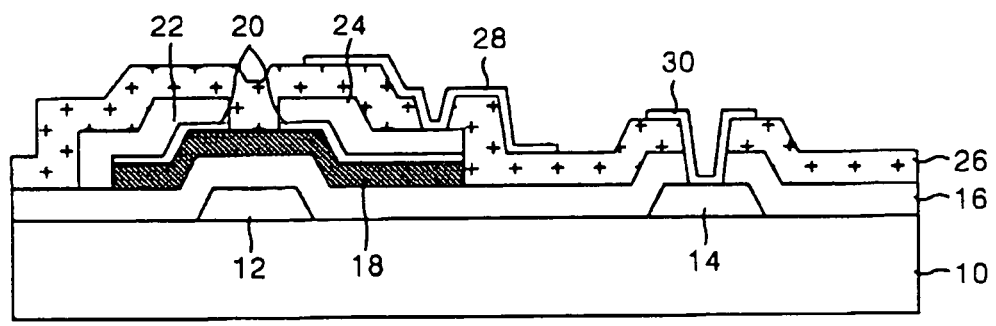
Figure 2A:
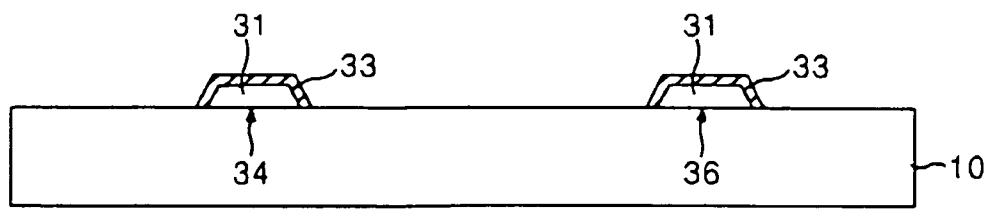
FIGS. 2A to 2E are section views showing a conventional method of fabricating a liquid crystal display employing a double gate metal layer.
Figure 2B:
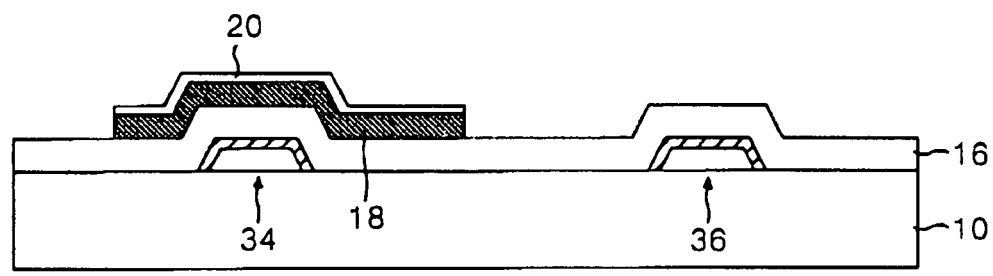
Figure 2C:
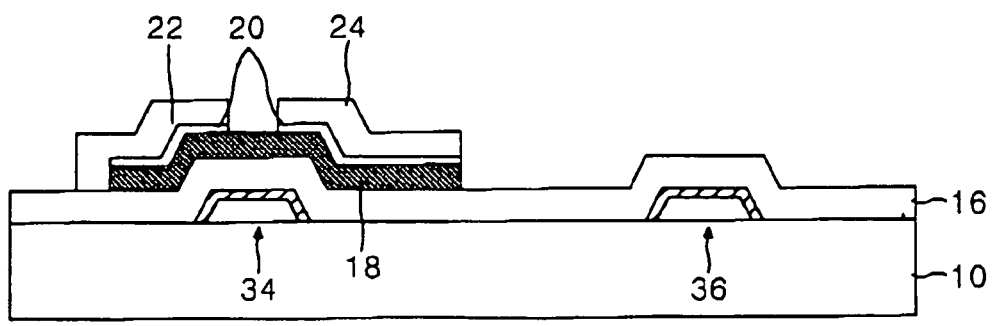
Figure 2D:
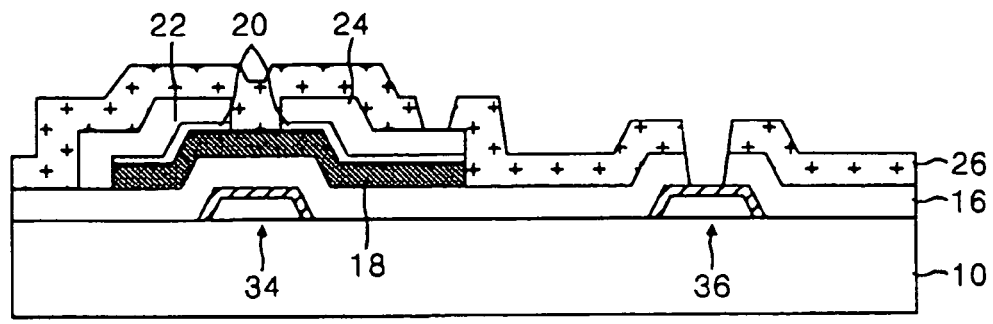
Figure 2E:
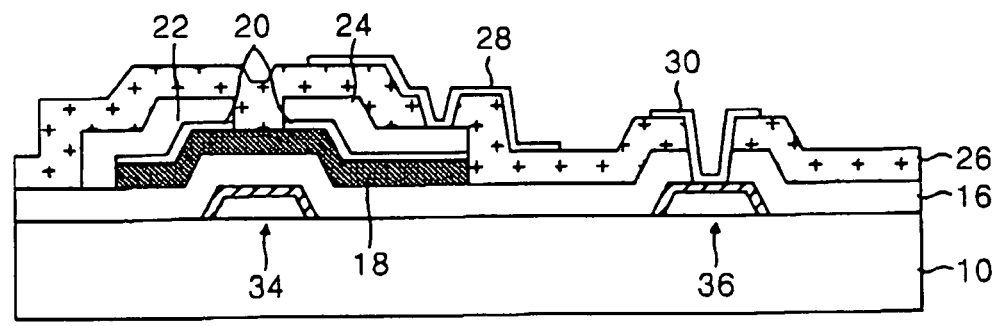
Figure 3:
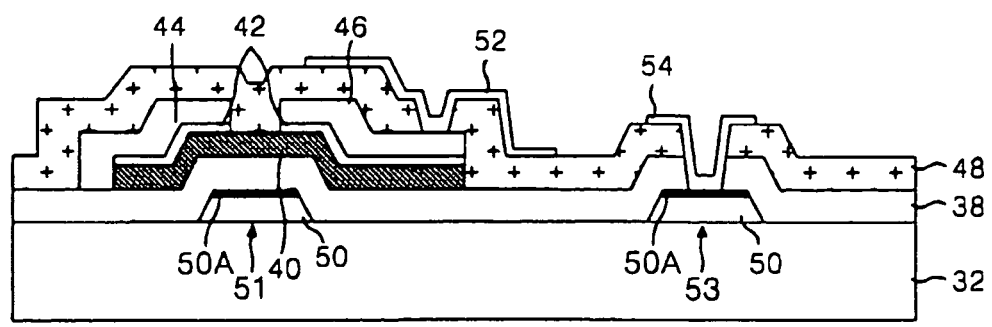
FIG. 3 is a cross-sectional view showing a structure of a liquid crystal display device according to the present invention.

FIG. 3 is a cross-sectional view showing a structure of an exemplary liquid crystal display device according to the present invention, which particularly shows a thin film transistor part and a gate pad part.

In FIG. 3, the thin film transistor includes a gate electrode 51, an insulating film 38, an active layer 40, an ohmic contact layer 42, and a source electrode 44 and a drain electrode 46 separately formed on the ohmic contact layer 42. A passivation layer 48 is formed on the thin film transistor and a pixel electrode 52 is formed on the passivation layer 48. The pixel electrode 52 contacts the drain electrode via a contact hole formed in the passivation layer 48.

Further in FIG. 3, a gate pad portion includes a gate pad 53 and a transparent electrode 54 in electrical contact with the gate pad 53 via a contact hole formed in the gate insulating film 38 and the passivation layer 48. Gate patterns including the gate electrode 51 and the gate pad 53 include a first metal layer 50 of Al-alloy metal, and an alloy layer 50A that is made from an alloy of aluminum and a metal having low electrical contact resistance and formed at an upper portion of the first metal layer 50. The first metal layer 50 is made from an aluminum alloy, such as AlNd, and the alloy layer 50A is formed from an alloy of the first metal layer together with Mo or Cr. The alloy layer 50A is made by forming a second metal layer of Mo or Cr on the first metal layer 50 and then removing the second metal layer. Moreover, the alloy layer 50A is formed within the first metal layer 50 because Mo (or Cr) causes a chemical reaction between the Al-alloy of the first metal layer 50 and the Mo (or Cr) when continuously deposited. This is because molybdenum (or chromium) particles penetrate into the Al-alloy of the first metal layer due to heat generated during the deposition process. Accordingly, the alloy layer 50A remains within the first metal layer 50 even when the second metal layer is removed, thereby reducing an electrical contact resistance between the gate pad 53 and the transparent electrode 54.

FIGS. 4A to 4E show a method of fabricating a liquid crystal display device according to the present invention.

Figure 4A:
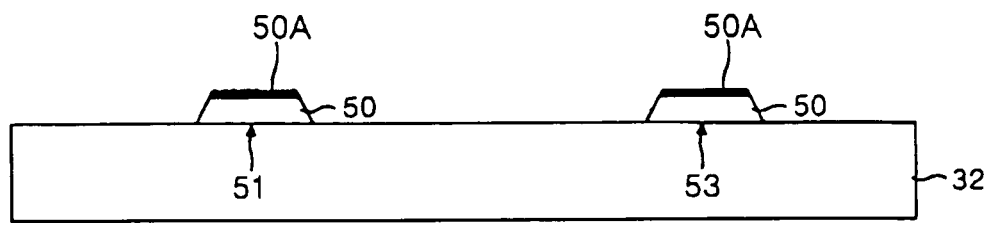
FIGS. 4A to 4E are cross-sectional views showing a method of fabricating the liquid crystal display device of FIG. 3.

In FIG. 4A, a first metal layer 50 is formed on the transparent substrate 32 by a deposition technique such as sputtering, for example. The first metal layer 50 has a thickness of about 2000 to 3000Å, preferably a thickness of 2500Å. Subsequently, a second metal layer of molybdenum (Mo) or chromium (Cr) is formed on the first metal layer 50 by the same deposition technique used to form the first metal layer 50. The second metal layer has a thickness of about 100 to 500Å, preferably a thickness of 300Å. The alloy layer 50A of the first metal layer 50 and the second metal layer are formed at an upper portion of the first metal layer 50 by heat generated during deposition of the second metal layer. Then, the second metal layer is removed by a dry etching process, for example. Subsequently, the first metal layer 50 including the alloy layer 50A is patterned by photolithographic and wet etching processes, thereby forming gate patterns that include a gate line (not shown), a gate electrode 51 and a gate pad 53.

Figure 4B:
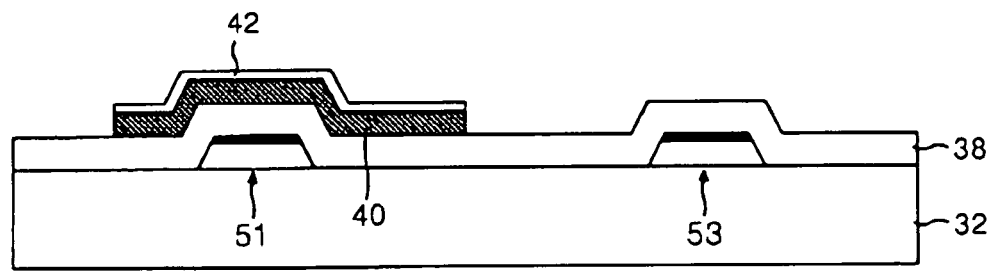

In FIG. 4B, a gate insulating film 38 is formed on the transparent substrate 32 that has been previously provided with the gate patterns. The gate insulating film 38 may be made from a silicon oxide ($SiO_x$) or a silicon nitride ($SiN_x$), for example. A semiconductor layer and a semiconductor layer doped with an impurity are continuously deposited onto the gate insulating film 38 by a chemical vapor deposition (CVD) process. The semiconductor layer may be made from amorphous silicon. Then, the semiconductor layer and the semiconductor layer doped with an impurity are patterned by photolithographic and dry etching processes, thereby forming an active layer 40 and an ohmic contact layer 42.

Figure 4C:
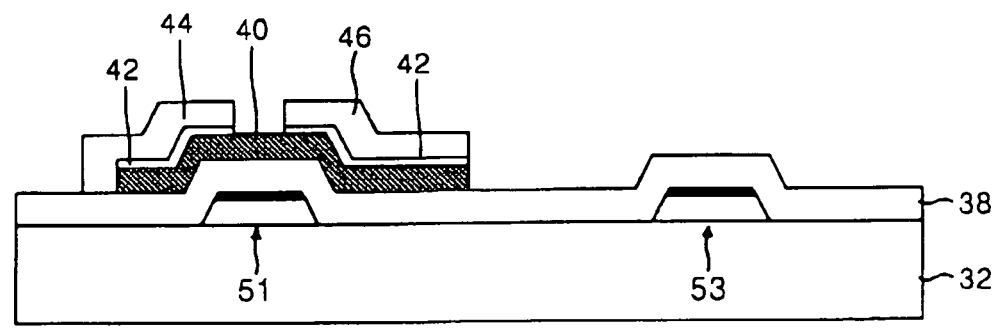

In FIG. 4C, a source/drain metal is deposited onto the gate insulating film 38 and the active layer 40 and the ohmic contact layer 42 by deposition such as sputtering, for example. The source/drain metal may be chromium (Cr), molybdenum (Mo), titanium (Ti) or tantalum (Ta), or a molybdenum alloy such as MoW MoTa or MoNb. Subsequently, the source/drain metal layer is patterned by photolithographic and wet etching processes, thereby forming source/drain patterns including a data line (not shown), a data pad (not shown), a source electrode 44 and a drain electrode 46. Then, a portion of the ohmic contact layer 42 that is exposed between the source electrode 44 and the drain electrode 46 is removed by a dry etching process, thereby electrically separating the source electrode 44 from the drain electrode 46.

Figure 4D:
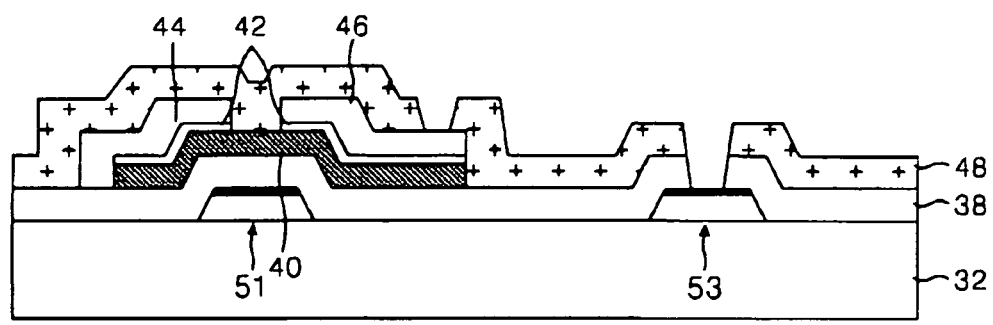

In FIG. 4D, a passivation layer 48 is formed on the gate insulating film 38 and the source/drain patterns. The passivation layer 48 may be made from an organic material (such as silicon nitride or silicon oxide), or an inorganic material (such as an acrylic organic compound, benzocyclobutene (BCB), or perfluorocyclobutane (PFCB)). The passivation layer 48 is patterned by photolithographic and dry etching processes, thereby defining a contact hole exposing a portion of the drain electrode 46 and a contact hole exposing portions of the gate pad 53 and the data pad (not shown).

Figure 4E:
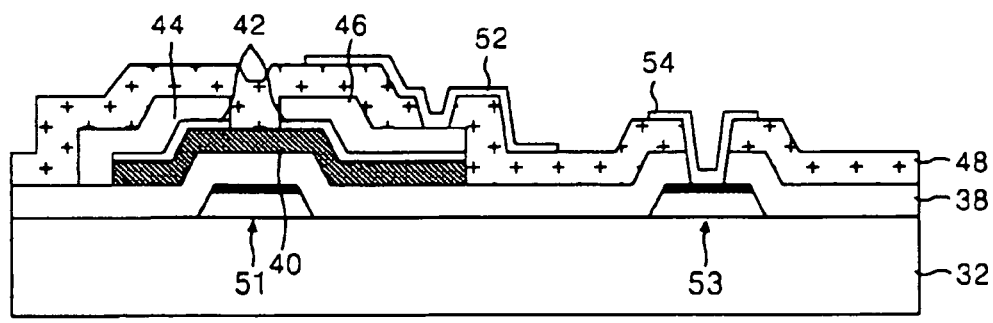

In FIG. 4E, a transparent electrode layer is formed on the passivation layer 48 by deposition such as sputtering, for example. The transparent electrode layer may be made from indium-tin-oxide (ITO) or indium-zinc-oxide (IZO), for example. Then, the transparent layer is patterned by photolithographic and etching processes, thereby forming a pixel electrode 52 and a transparent electrode 54. The pixel electrode 52 is connected to the drain electrode 46 via the contact hole formed in the passivation layer 48. The transparent electrode 54 is connected to the gate pad 53 via the contact hole formed in the passivation layer 48 and the gate insulating film 38. In this case, the transparent electrode 54 may be made from a transparent material in contact with the alloy layer 50A of the gate pad 53 to reduce an electrical contact resistance between the transparent electrode 54 and the gate pad 53.

In accordance with the LCD device described above, an electrode metal layer is formed in a double layer structure without requiring additional masking processes. Accordingly, deceased contact resistance between the electrode metal layer and transparent electrode is achieved. Moreover, because fewer masking steps are used, yield ratios are improved and manufacturing costs are improved.

It will be apparent to those skilled in the art that various modifications and variations can be made in the liquid crystal display and method thereof of the present invention without departing from the spirit or scope of the invention. Thus, it is intended that the present invention covers the modifications and variations of this invention provided they come within the scope of the appended claims and their equivalents.

What is claimed is:

1. A method of fabricating a liquid crystal display device, comprising the steps of:
   sequentially depositing a first metal layer of a first metal and a second metal layer of a second metal on an entire surface of a substrate;
   naturally forming an alloy layer using heat generated from the deposition of the second metal layer during the deposition of the second metal layer, the alloy layer being formed from an alloy including the first metal of the first metal layer and the second metal of the second metal layer within an upper portion of the first metal layer;
   removing the second metal layer on the alloy layer;
   patterning the first metal layer and the alloy layer using a mask process to form a conductive line;
   forming an insulating film having a contact hole on the alloy layer; and
   forming a transparent electrode in electrical contact with the alloy layer via the contact hole.

2. The method according to claim 1, wherein the first metal includes an aluminum-alloy.

3. The method according to claim 1, wherein the first metal layer has a thickness of about 2000 to 3000 Å.

4. The method according to claim 1, wherein the second metal is one of molybdenum and chromium.

5. The method according to claim 4, wherein the second metal layer has a thickness of about 100 to 500 Å.

6. The method according to claim 1, wherein said conductive line includes one of a gate line, a gate electrode, and a gate pad.

* * * * *